US006990392B1

(12) United States Patent
Meister et al.

(10) Patent No.: US 6,990,392 B1
(45) Date of Patent: Jan. 24, 2006

(54) APPARATUS AND METHOD FOR PROVIDING ITEMS OF VALUE IN COOPERATION WITH OPERATION OF A COMPANION DEVICE

(76) Inventors: Spencer Andrew Meister, 12186 W. 75th La., Arvada, CO (US) 80005; David Alan Tracy, 4880 W. 98th Ave., Westminster, CO (US) 80031

( * ) Notice: Subject to any disclaimer, the term of this patent is extended or adjusted under 35 U.S.C. 154(b) by 77 days.

(21) Appl. No.: 09/644,594

(22) Filed: Aug. 23, 2000

(51) Int. Cl.
G07F 17/00 (2006.01)
G07F 7/00 (2006.01)

(52) U.S. Cl. .................... 700/242; 700/219; 700/216; 700/239; 700/235

(58) Field of Classification Search ................ 700/231, 700/236, 235, 239, 244, 249, 241, 242, 219, 700/216
See application file for complete search history.

(56) References Cited

U.S. PATENT DOCUMENTS

| 4,225,056 | A | * | 9/1980 | Flubacker | 221/9 |
| 4,454,670 | A | * | 6/1984 | Bachmann et al. | 40/584 |
| 4,677,565 | A | * | 6/1987 | Ogaki et al. | 364/479 |
| 4,839,505 | A | * | 6/1989 | Bradt et al. | 235/381 |
| 4,872,541 | A | * | 10/1989 | Hayashi | 194/217 |
| 4,962,866 | A | * | 10/1990 | Phillips | 221/8 |
| 5,267,171 | A | * | 11/1993 | Suzuki et al. | 364/479 |
| 5,316,124 | A | * | 5/1994 | Barnes et al. | 194/206 |
| 5,335,816 | A | * | 8/1994 | Kaufman et al. | 221/13 |
| 5,450,938 | A | * | 9/1995 | Rademacher | 194/206 |
| 5,482,139 | A | * | 1/1996 | Rivalto | 186/36 |
| 5,513,117 | A | * | 4/1996 | Small | 364/479 |

(Continued)

FOREIGN PATENT DOCUMENTS

WO WO 96/06415 A1 * 2/1996

OTHER PUBLICATIONS

Web pages (2 pages) from www.bellatrix.com re: "Freedom" newsrack; Aug. 21, 2000.

(Continued)

Primary Examiner—Donald P. Walsh
Assistant Examiner—Michael E Butler
(74) Attorney, Agent, or Firm—Law Office of Donald D. Mondul

(57) ABSTRACT

An apparatus for providing at least one item of value in cooperation with operation of a companion device delivering at least one first product to a user comprises: (a) a control means for controlling the providing; (b) a providing means for effecting the providing; the providing means being coupled with the control means; and (c) a link with the companion device for effecting the cooperation. The apparatus may further comprise (d) a communication means coupled with the control means for communicating operational information with the apparatus regarding operation of the apparatus; and (e) a memory means coupled with the communication means for storing the operational information. The method comprises the steps of: (a) providing a control means for controlling the providing; (b) providing a providing means coupled with the control means for effecting the providing; and (c) providing a link with the companion device for effecting the cooperation. The method may comprise the further steps of: (d) providing a communication means coupled with the apparatus for communicating operational information with the apparatus regarding operation of the apparatus; and (e) providing a memory means coupled with the communication means for storing the operational information. The method may still further comprise the step of: (f) communicating at least one directive with the apparatus from a locus remote from the apparatus for effecting a change regarding the at least one item of value.

9 Claims, 4 Drawing Sheets

U.S. PATENT DOCUMENTS

| | | | | |
|---|---|---|---|---|
| 5,550,746 | A | * | 8/1996 | Jacobs .................. 364/479.01 |
| 5,555,497 | A | * | 9/1996 | Helbling ....................... 705/14 |
| 5,596,501 | A | * | 1/1997 | Comer et al. .......... 364/464.23 |
| 5,652,421 | A | * | 7/1997 | Veeneman et al. .......... 235/381 |
| 5,724,518 | A | * | 3/1998 | Helbiling .................... 395/201 |
| 5,725,124 | A | * | 3/1998 | Bustos et al. ................ 221/211 |
| 5,728,999 | A | * | 3/1998 | Teicher ....................... 235/381 |
| 5,761,648 | A | * | 6/1998 | Golden et al. ................ 705/14 |
| 5,822,216 | A | * | 10/1998 | Satchell, Jr. et al. .... 364/479.01 |
| 5,842,188 | A | * | 11/1998 | Ramsey et al. ............. 705/416 |
| 5,865,340 | A | * | 2/1999 | Alvern ......................... 221/13 |
| 5,875,110 | A | * | 2/1999 | Jacobs .................. 364/479.02 |
| 5,957,326 | A | * | 9/1999 | Ostgaard ..................... 221/211 |
| 5,993,048 | A | * | 11/1999 | Banks et al. ........... 364/479.03 |
| 5,996,765 | A | * | 12/1999 | Ock ........................... 194/217 |
| 6,021,362 | A | * | 2/2000 | Maggard et al. ............ 700/234 |
| 6,056,194 | A | * | 5/2000 | Kolls .......................... 235/381 |
| 6,059,142 | A | * | 5/2000 | Wittern, Jr. et al. ............. 221/1 |
| 6,112,497 | A | * | 9/2000 | Credle, Jr. .................... 53/48.5 |
| 6,161,059 | A | * | 12/2000 | Tedescp et al. ............. 700/232 |
| 6,182,857 | B1 | * | 2/2001 | Hamm et al. ................... 221/2 |
| 6,247,612 | B1 | * | 6/2001 | Kaufman ................ 221/312 C |
| 6,292,711 | B1 | * | 9/2001 | LaDue ........................ 700/241 |
| 6,295,482 | B1 | * | 9/2001 | Tognazzini ................. 700/233 |
| 6,346,951 | B1 | * | 2/2002 | Mastronardi ................ 345/716 |
| 6,397,193 | B1 | * | 5/2002 | Walker et al. ................. 705/16 |
| 6,401,009 | B1 | * | 6/2002 | Chandonnet ................ 700/231 |
| 6,628,764 | B1 | * | 9/2003 | Petite .................... 379/106.01 |

OTHER PUBLICATIONS

Web page (1 page) from www.betterpackages.com re: "Tapeshooter 404" packege sealer; Aug. 21, 2000.

* cited by examiner

APPARATUS AND METHOD FOR PROVIDING ITEMS OF VALUE IN COOPERATION WITH OPERATION OF A COMPANION DEVICE

BACKGROUND OF THE INVENTION

The present invention is directed to apparatuses and methods for conveying a marketing message, or indicia of value or items of value to an audience. The present invention is particularly directed to such apparatuses and methods that effect such conveyance in cooperation with operation of a companion device.

By way of example, a consumer, or user, operating a newspaper vending machine pays money, usually by inserting predetermined coinage into a slot. As a result of inserting proper coinage, the user may obtain a single copy of the newspaper. The only revenue generated by the transaction is the coinage inserted for the sale of the newspaper. There are typically a variety of advertisements included in a newspaper that may be incorporated into pages of the newspaper, or they may be in the form of individual inserts. An average Sunday newspaper may have on the order of fifty to seventy advertising inserts.

It would be of value to be able to present an offering for value in addition to the newspaper and its included advertising and inserts. Such an offering has an advantage of being particularly noticeable by users because it is presented individually, in conjunction with the newspaper purchase, but it is not integrated into the newspaper offering. Such individuality allows a particular advertiser or advertisers to "break from the clutter" of advertising by its peers to stand apart from the other advertisers lumped together in the newspaper offering.

Such an offering of advantage for advertisers also provides an opportunity for newspaper publishers to gain additional revenues from the advertisers availing themselves of the new individuality in advertising. It is even likely that such an individualistic advertising offering may increase revenues for newspaper vending machines when empty of newspapers. For example, it may worthwhile for a user to insert twenty-five cents or fifty cents in return for a coupon good for "2-for-1" on a hamburger in a neighborhood establishment, even though the newspaper vending machine is empty of newspapers.

Providing a communication capability for updating or changing the offering or offerings from the apparatus of the present invention increases flexibility of operation for the apparatus and decreases costs of maintenance for effecting such changes. Such a communication capability may range from a simple access port on the apparatus to a remote communication capability. An access port provides access to an operator on the scene without having to open the apparatus to reprogram or other wise amend the offering. Access port communication may include mechanical coupling, infrared or other optical coupling, magnetic coupling, capacitive coupling or other communication links.

A remote communication capability permits effecting changes from a locus remote from the apparatus. Remote communication capabilities may include telephone connections, satellite communications, cable connections (including coaxial cable and optical cable), radio communications and other communication techniques.

There is a need for an apparatus and method for providing items of value in cooperation with operation of a companion device. One advantage of such an apparatus is that it provides more individuality for advertisers. A remote communication capability with an associated memory and control capability is particularly desirable for creating a cost-effective flexible apparatus.

SUMMARY OF THE INVENTION

An apparatus for providing at least one item of value in cooperation with operation of a companion device delivering at least one first product to a user comprises: (a) a control means for controlling the providing; (b) a providing means for effecting the providing; the providing means being coupled with the control means; and (c) a link with the companion device for effecting the cooperation. The apparatus may further comprise (d) a communication means coupled with the control means for communicating operational information with the apparatus regarding operation of the apparatus; and (e) a memory means coupled with the communication means for storing the operational information. The method comprises the steps of: (a) providing a control means for controlling the providing; (b) providing a providing means coupled with the control means for effecting the providing; and (c) providing a link with the companion device for effecting the cooperation. The method may comprise the further steps of: (d) providing a communication means coupled with the apparatus for communicating operational information with the apparatus regarding operation of the apparatus; and (e) providing a memory means coupled with the communication means for storing the operational information. The method may still further comprise the step of: (f) communicating at least one directive with the apparatus from a locus remote from the apparatus for effecting a change regarding the at least one item of value.

The apparatus and method of the present invention provide increased flexibility, individuality and visibility for advertisers. The apparatus and method of the present invention may be used with any of various companion devices, including, by way of example, vending machines for newspapers, soda, water, candy, stamps, food, public telephones, toll booth ticket dispensers, parking meters, parking lot ticket dispensers, laundry machines (washers and dryers), novelties, condoms, sanitary napkins, medicines, and other vending machines. Other examples of useful companion devices for the apparatus and method of the present invention include gas pumps; pay air pumps; pen, pencil and stationery machines; automatic teller machines (ATMs); phone card machines; gambling devices; interactive kiosks; airline ticket machines; bus ticket machines and mass transit commuter access machines.

Cable television set-top devices are also appropriate companion devices for use with the present invention. In such a cable television environment, for example, an operator (such as a cable service provider) may employ the present invention for dispensing indicia of value (e.g., coupons redeemable for merchandise, discounts, or services) during airing of a commercial for a particular product at the viewer's locus. Alternatively, coupons or other indicia of value may be sent via an Internet connection or other connection (e.g., the cable supplying the video signal to the television) to a predetermined e-mail address. Preferably, the indicia of value may be related to the commercial airing on the television monitor at a particular time. Such a capability thus provided by the present invention allows broadcast media to receive quantifiable feedback from consumers relating to their dollars spent on television advertising. This is believed to be the first time such large volume, direct, relatively low cost feedback relating to advertising expenditures has been available in broadcast environments. By monitoring use levels of particular coupons, a broadcaster or an advertiser may receive direct feedback indicating viewership of a particular advertisement. Time, channel, geographic and other indications may be provided on individual coupons (printed, coded or uncoded), thereby providing very detailed information for advertisers and broadcasters when the coupons or other indicia of value are redeemed.

The sorts of things that may be dispensed by the present invention include coupons redeemable for discounts or merchandise or services, sample merchandise (e.g., coffee, shampoo, toothpaste or other products), messages (e.g., in a video display, a light emitting diode (LED) readout or an audio message), or any combination of coupons, samples and messages.

The apparatus of the present invention may be embodied in a discrete apparatus attached externally upon or internally within a companion device. Alternatively, the apparatus may be integrally incorporated with a companion device. Such an integral configuration may be manifested in software that is resident within a memory structure that is shared with the companion device for controlling and operating the apparatus of the present invention. Such integration of all or part of the apparatus of the present invention is considered to be within the intended scope of the present invention. Further, other aspects of the apparatus of the present invention may be shared with a companion device. For example, if the companion device prints receipts or other indicia (e.g., a gasoline pump), the apparatus may share the printer used for printing gasoline receipts for producing coupons or other indicia of value according to the present invention. Such integration of functions among an apparatus and an associated companion device (or devices) is considered within the intended scope of the present invention.

Any embodiment of the present invention, whether partially integrated with a companion device (or more than one companion device), resident within a memory structure that is shared with the companion device or employed as an individual discrete apparatus, is within the intended scope of the present invention. The providing of at least one item of value in cooperation with the companion device may be effected either individually, or in an integrated configuration with at least one companion device.

Further features of the present invention will be apparent from the following specification and claims when considered in connection with the accompanying drawings, in which like elements are labeled using like reference numerals in the various figures, illustrating the preferred embodiments of the invention.

DETAILED DESCRIPTION OF THE DRAWINGS

Figure 1:
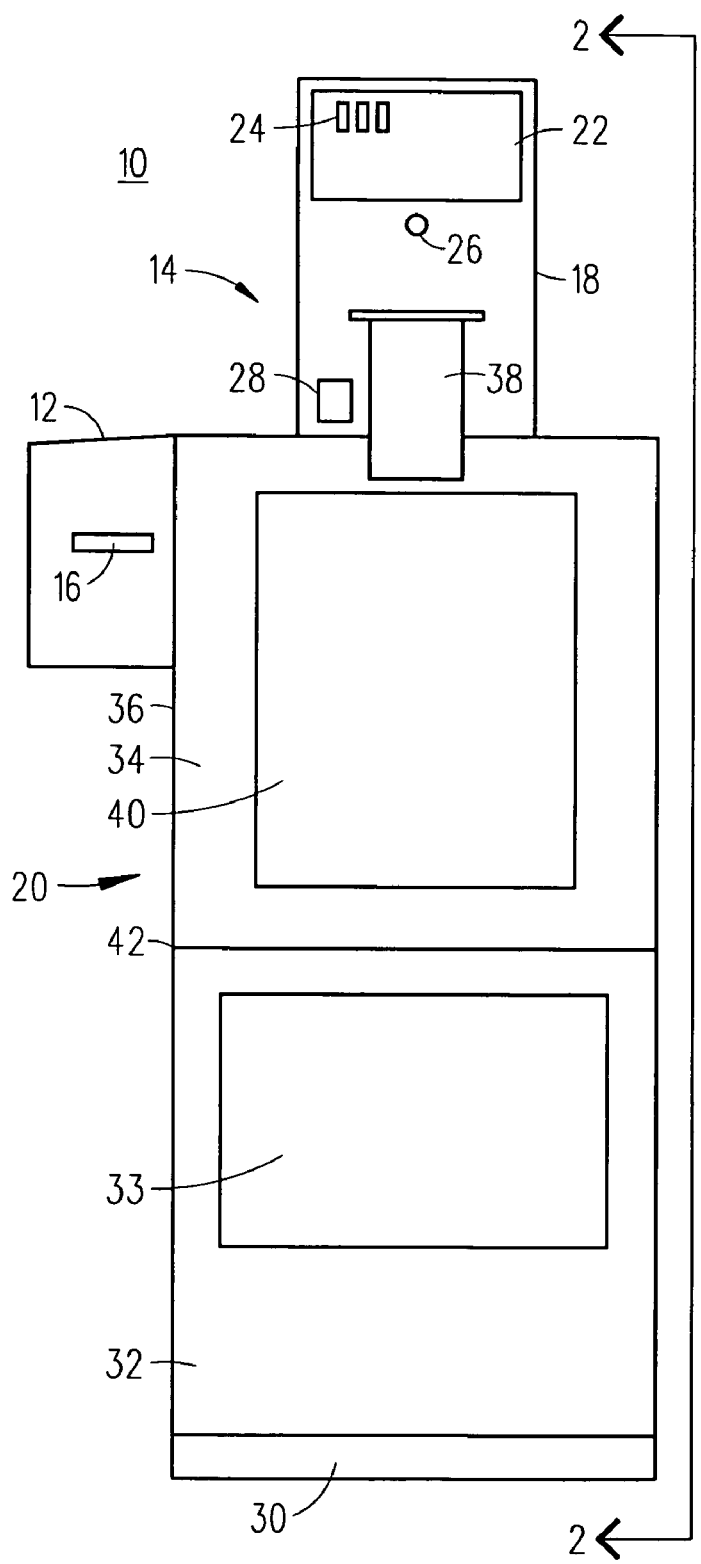
FIG. 1 is a front elevation view of an embodiment of the apparatus of the present invention.

FIG. 1 is a front elevation view of an embodiment of the apparatus of the present invention. In FIG. 1, a vending appliance 10 includes a coupon dispensing apparatus 12 attached externally to a companion vending device 14. In the exemplary embodiment illustrated in FIG. 1, vending device 14 is configured for selling newspapers. Coupon dispensing apparatus 12 includes a slot 16 through which coupons are dispensed when coupon dispensing apparatus 12 is operated.

Vending device 14 includes a money-dealing section 18 and a storage and dispensing section 20. Money-dealing section 18 presents a display area 22 that may surround coin slots 24. There are frequently several coin slots 24 provided to accommodate different denominations of coins. Money-dealing section 18 also includes a coin return actuator button 26 and a coin return slot 28.

Dispensing section 20 includes a base 30, a storage area 32 and a newspaper area 34. Storage area may have a presentation structure 33 for holding advertising or other materials (not shown in FIG. 1). Newspaper area 34 is accessed by a door 36. Door 36 has a handle 38 and an integral display window 40. Display window 40 may be transparent to facilitate a user's discerning whether any newspapers remain for purchase within newspaper area 34, or display window 40 may be partially or fully filled by advertising or other displayed printed materials. Door 36 is configured to rotate about a hinge 42. In operating vending appliance 10, a user deposits a predetermined amount of coinage into selected of coin slots 24. The coinage operates to release a catch (not shown in FIG. 1) holding door 36. The user may then pull upon handle 38 to rotate door 36 about hinge 42 and expose newspaper area 34. The user may then reach into newspaper area 34 to retrieve a newspaper.

Door 36 is linked with coupon dispensing apparatus 12 to actuate coupon dispensing apparatus 12 when door 36 is rotated about hinge 42 by pulling upon handle 38. Actuating coupon dispensing apparatus 12 presents a coupon (or other indicia of value) at slot 16 for retrieval by the user.

Figure 2:
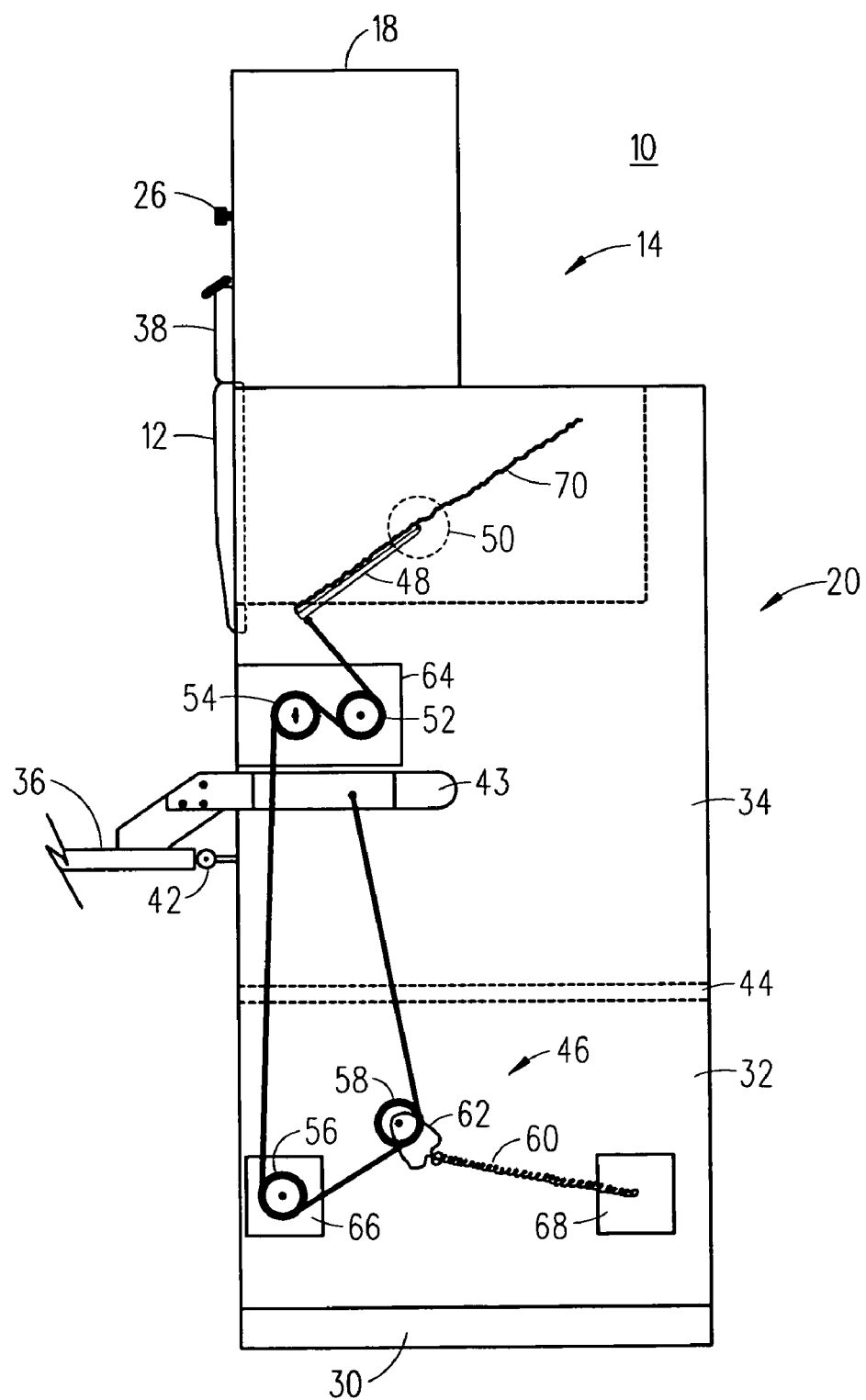
FIG. 2 is a side view of the embodiment of the present invention illustrated in FIG. 1, viewed along Section 2—2 in FIG. 1, illustrating selected aspects of the present invention with a side panel of the companion device removed.

FIG. 2 is a side view of the embodiment of the present invention illustrated in FIG. 1, viewed along Section 2—2 in FIG. 1, illustrating selected aspects of the present invention with a side panel of the companion device removed. In FIG. 2, vending appliance 10 is illustrated with door 36 in an open position extending substantially horizontally from hinge 42 to provide access to the interior of newspaper area 34. An arm 43 is attached to door 36 to move from a vertical position (not shown in FIG. 2) when door 36 is closed to a horizontal position (shown in FIG. 2) when door 36 is open (as in FIG. 2).

Newspaper area 34 and storage area 32 are separated by a shelf 44. Shelf 44 is illustrated in phantom to allow detailed illustration of selected aspects of the apparatus of the present invention, and particularly to illustrate linkage between coupon dispensing apparatus 12 and companion vending device 14.

Linkage is established by a cable assembly 46 connecting arm 43 on door 36 with an actuating lever 48 connected with coupon dispensing apparatus 12 for operating coupon dispensing apparatus 12. Actuating lever 48 accesses coupon dispensing apparatus 12 for operational movement through an access aperture 50. Cable assembly 46 is connected with arm 43 and actuating lever 48 via pulleys 52, 54, 56, 58. Pulley 58 is employed as a tensioner pulley in cooperation with a bias provided by a spring 60 and an idler block 62. Pulleys 52, 54 are mounted upon a support block 64; support block 64 is affixed with a side wall of storage and dispensing section 20. Pulley 56 is mounted upon a support block 66; support block 66 is affixed with a side wall of storage and dispensing section 20. Spring 60 is mounted upon a support block 68; support block 68 is affixed with a side wall of storage and dispensing section 20. A bias spring 70 is attached with actuating lever 48 to return actuating lever 48 to a ready position when door 36 is closed.

Cable assembly 46 effects cooperative movement between door 36 and actuating lever 48. Accordingly, when door 36 is opened and arm 43 is moved to a substantially horizontal orientation, cable assembly 46 operates to move actuating arm 48 downward. Downward motion by actuating arm 48 advances a preset length of printed tape (e.g., a preset number of coupons) from coupon dispensing apparatus 12 for collection by a user. Returning door 36 to a closed, or substantially vertical position orients arm 43 in an substantially vertical position. Cable assembly 46 responsively allows spring 70 to return actuating lever 48 to its ready position when door 36 is closed.

Limits may be set within coupon dispensing apparatus 12 to ensure that a user must completely close door 36 to reset coupon dispensing apparatus 12 for dispensing another coupon. Such an adjustment is necessary to preclude a user's cycling door 36 from a near-closed position to an open position to effect repeated dispensing of coupons by coupon dispensing apparatus 12. For similar reasons, cable assembly 46 is preferably enclosed in a shroud or other covering (not shown in FIG. 2) to preclude access by a user to exercise cable assembly to produce repeated dispensing of coupons by coupon dispensing apparatus 12.

Figure 3:
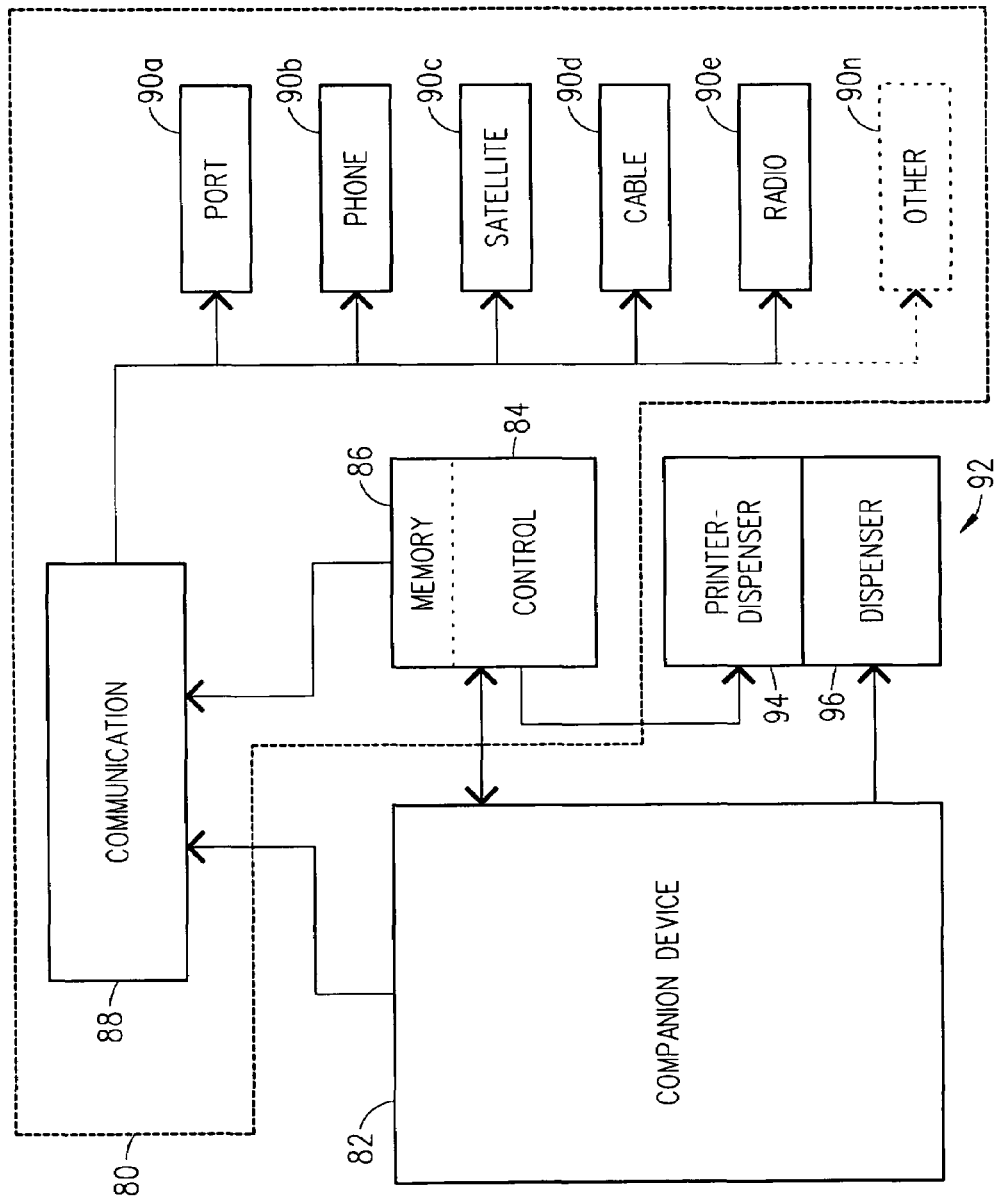
FIG. 3 is a schematic block diagram of the preferred embodiment of the apparatus of the present invention.

FIG. 3 is a schematic block diagram of the preferred embodiment of the apparatus of the present invention. In FIG. 3, an apparatus 80 is coupled with a companion device 82 for cooperative operation to provide items of value by apparatus 80. Apparatus 80 includes a control unit 84 for controlling operation of apparatus 80. Preferably control unit 84 is embodied in a microprocessor device for executing software program instructions stored in an associated memory 86. Other embodiments of control unit, or means 84 may include a mechanical link between apparatus 80 and companion device 82 that controls operation of apparatus 80 in a particular manner in cooperation with operation of companion device 82. An example of such a mechanical link was illustrated in FIG. 1 by using cable assembly 46 to establish the desired operational link between coupon dispensing apparatus 12 and companion vending device 14. Other linkages for establishing a desired operational relation between apparatus 80 and companion device 82 (e.g., mechanical, electrical, wireless, optical and other linkages) are within the intended scope of the present invention.

Apparatus 80 preferably includes a communication unit, or means 88. Communication unit 88 is preferably configured to establish communications with operators from without apparatus 80 (not shown in FIG. 3). Communications may be established by one or more of several communications media 90. For example, communications may be established via a communication port 90a accessible for communication hook up externally of communication means may include, by way of example, infrared coupling, sonic coupling, magnetic coupling, capacitive coupling or other communication media.

Remote means of communications may, for example, include telephone communications 90b, satellite communications 90c, cable communications (electrical or optical) 90d, radio communications 90e (including mobile telephone communications) and other communications means 90n.

A providing unit or means 92 is coupled with apparatus 80 and with companion device 82. Providing device 92 may include either one or both of a printer-dispenser unit 94 and a dispenser unit 96. Providing unit 92 is illustrated in FIG. 3 as a separate unit from either apparatus 80 or companion device 82 to indicate that each of apparatus 80 and companion device 82 may have their own discrete providing unit 92, or apparatus 80 and companion device 82 may share one or both of a printer-dispenser unit 94 and a dispenser 96. Providing unit 92 may include, by way of example, a display, a provider of indicia of value (such as coupons from a coupon dispensing apparatus 12; FIG. 1), a shared printer-coupon dispenser in an arrangement in which companion device prints an item (such as a receipt printed by a gasoline pump), a provider of product samples or another providing system or unit that provides information, displays, products, coupons or other items of value. The sorts of things that may be provided or dispensed by providing unit 92 include coupons redeemable for discounts or merchandise or services, sample merchandise (e.g., coffee, shampoo, toothpaste or other products), messages (e.g., in a video display, a light emitting diode (LED) readout or an audio message), or any combination of coupons, samples and messages.

Companion device 82 may be embodied in any of one or more of a variety of devices including, for example, vending machines for newspapers, soda, water, candy, stamps, food, public telephones, toll booth ticket dispensers, parking meters, parking lot ticket dispensers, laundry machines (washers and dryers), novelties, condoms, sanitary napkins, medicines, and other vending machines. Other examples of embodiments of companion device 82 include gas pumps; pay air pumps; pen, pencil and stationery machines; automatic teller machines (ATMs); phone card machines; gambling devices; interactive kiosks; airline ticket machines; bus ticket machines and mass transit commuter access machines.

Cable television set-top devices may also embody companion device 82. Using a set-top device in a cable television environment, for example, a cable service provider or operator may employ an apparatus according to the present invention for dispensing indicia of value (e.g., coupons redeemable for merchandise, discounts, or services) during airing of a commercial for a particular product at the viewer's locus. Alternatively, coupons or other indicia of value may be sent via an Internet connection or other connection (e.g., the cable supplying the video signal to the television) to a predetermined e-mail address. Preferably, the indicia of value may be related to the commercial airing on the television monitor at a particular time.

Figure 4:
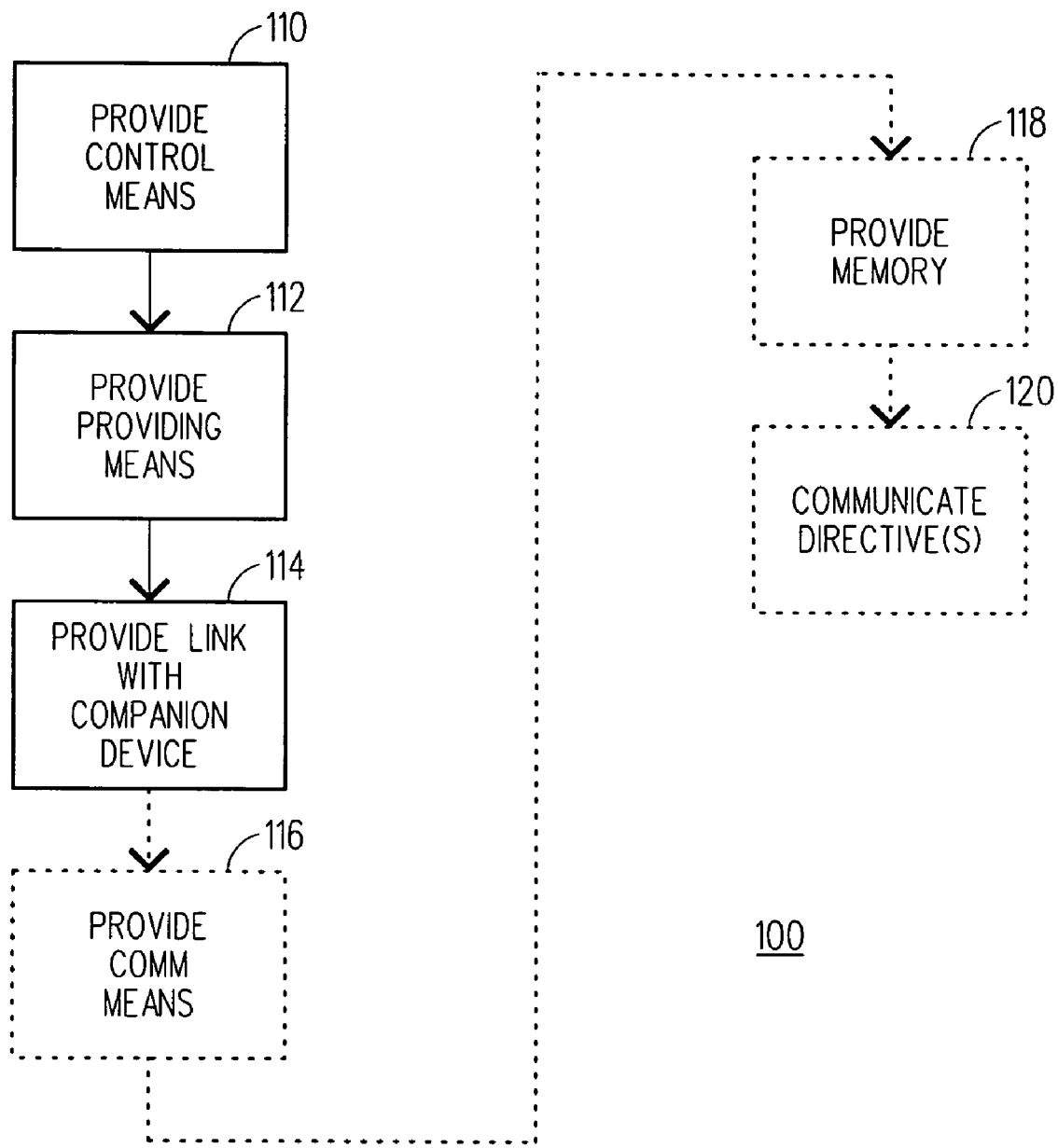
FIG. 4 is a block diagram illustrating the method of the present invention.

FIG. 4 is a block diagram illustrating the method of the present invention. In FIG. 4, a method 100 for providing at least one item of value from an apparatus in cooperation with operation of a companion device delivering at least one first product to a user begins with the step of providing a control means for controlling the providing, as indicated by a block 110. The method continues by providing a providing means coupled with the control means for effecting the providing, as indicated by a block 112. The method continues by providing a link with the companion device for effecting the cooperation, as indicated by a block 114.

The method may continue with providing a communication means coupled with the apparatus for communicating operational information with the apparatus, as indicated by a dotted-line box 116. Dotted-line boxes in FIG. 4 relate to aspects of the method of the present invention that are addressed in dependent claims in the present application. The method may further continue by providing a memory means coupled with the communication means for storing the operational information communicated, as indicated by a dotted-line box 118. The method may still further continue by communicating at least one directive with the apparatus that effects a change regarding the at least one item of value from a locus remote from the apparatus, as indicated by a dotted-line box 120.

It is to be understood that, while the detailed drawings and specific examples given describe preferred embodiments of the invention, they are for the purpose of illustration only, that the apparatus and method of the invention are not limited to the precise details and conditions disclosed and that various changes may be made therein without departing from the spirit of the invention which is defined by the following claims:

We claim:

1. An apparatus for use in cooperation with operation of an attached companion product vending device; said attached companion product vending device delivering at least one first product purchased by a user; said user initiating said purchase by conveying payment to said companion device and exercising an actuator; the apparatus comprising:
    (a) a control means for controlling the apparatus in dispensing at least one coupon in response to said exercising; said at least one coupon being redeemable for value in connection with purchasing at least one second product;
    (b) a providing means for effecting said dispensing; said providing means being coupled with said control means and responsive to said control means;
    (c) a direct link between the apparatus and said actuator for effecting said cooperation;
    (d) a communication means coupled with said control means for communicating operational information with the apparatus regarding operation of the apparatus; and
    (e) a memory means coupled with said communication means for storing said operational information;
said communication means comprising a telephone connection with a remote controlling station.

2. An apparatus for use in cooperation with operation of a companion product vending device; said companion product vending device and the apparatus being assembled in a unitary configuration; said companion product vending device delivering at least one first product purchased by a user; said user initiating said purchase by conveying payment to said companion device and exercising an actuator; the apparatus comprising:
    (a) a control means for controlling the apparatus in dispensing at least one coupon in response to said exercising; said coupon being redeemable for value in connection with purchasing at least one second product;
    (b) a providing means coupled with said control means for effecting said dispensing;
    (c) a direct link between the apparatus and said actuator for effecting said cooperation;
    (d) a communication means coupled with said control means for communicating operational information with the apparatus from outside the apparatus regarding operation of the apparatus; and
    (e) a memory means coupled with said communication means for storing said operational information; said communication means comprising a satellite communication connection with a remote controlling station.

3. An apparatus for use in cooperation with a vending device; said vending device having an interior storage cavity for storing a plurality of units of a product and a door; said door being enabled for moving from a closed position to an open position by a user conveying payment to said vending device; said cavity being accessible by said user when said door is in said open position; the apparatus comprising:
    (a) a control unit for controlling the apparatus in dispensing at least one coupon in response to said door moving from said closed position to said open position; said at least one coupon being redeemable for at least one product;
    (b) a providing means for effecting said dispensing; said providing means being coupled with said control means sand responsive to said control means; and
    (c) a direct link between the apparatus and said door for effecting said cooperation.

4. An apparatus for use in cooperation with a vending device as recited in claim 3 wherein the apparatus further comprises:
    (d) a communication means coupled with said control means for communicating operational information with the apparatus regarding operation of the apparatus; and
    (e) a memory means coupled with said communication means for storing said operational information.

5. An apparatus for use in cooperation with a vending device as recited in as recited in claim 4 wherein said communication means comprises a telephone connection with a remote controlling station.

6. An apparatus for use in cooperation with a vending device as recited in as recited in claim 4 wherein said communication means comprises an access port for providing control access by an operator effecting a connection with the apparatus via said access port.

7. An apparatus for use in cooperation with a vending device as recited in as recited in claim 4 wherein said communication means comprises a satellite communication connection with a remote controlling station.

8. An apparatus for use in cooperation with a vending device as recited in claim 4 wherein said link is a mechanical link connecting said door with the apparatus.

9. An apparatus for use in cooperation with a vending device as recited in claim 4 wherein said link is an electronic link connecting said door with the apparatus.

\* \* \* \* \*